United States Patent

Shively

[11] 4,052,783
[45] Oct. 11, 1977

[54] APPARATUS AND METHOD FOR WINDING ARMATURES

[76] Inventor: Lawrence A. Shively, 6014 Frederick Road, Dayton, Ohio 45414

[21] Appl. No.: 687,018

[22] Filed: May 17, 1976

[51] Int. Cl.² .................................... H02K 15/09
[52] U.S. Cl. .................................. 29/597; 29/598; 29/735; 29/736; 242/7.03; 242/7.05 B
[58] Field of Search ............ 29/597, 596, 598, 205 R, 29/205 CM, 732, 735, 736; 242/7.03, 7.05 R, 7.05 B, 7.05 C

[56] References Cited

U.S. PATENT DOCUMENTS

| | | | |
|---|---|---|---|
| 2,627,379 | 2/1953 | Moore | 242/7.05 B |
| 3,857,172 | 12/1974 | George et al. | 29/597 |
| 3,911,563 | 10/1975 | Anderson | 29/597 |
| 3,913,220 | 10/1975 | Miller | 29/597 |

Primary Examiner—Carl E. Hall
Attorney, Agent, or Firm—Jacox & Meckstroth

[57] ABSTRACT

An armature includes a shaft which supports a slotted core and a commutator having peripherally spaced hook-like tangs. The armature is automatically wound on a flyer-type winding machine which incorporates a novel lead forming and connecting mechanism. The mechanism includes a set of finger members each adapted to hook a lead wire extending from a wire coil to a rotating flyer after the winding of the last wire turn for the coil. Each finger member is then rotated approximately 180° for twisting the wire to form a twisted wire loop which is transferred from the finger member to a predetermined tang, forming an alpha-type connection of the lead wire with the tang. A movable wire gripping member is associated with the finger members to control when each lead wire loop is released from a finger member for transfer to a tang, thereby controlling the slack within each lead wire. The finger members and the wire gripping member are also movable as a unit to provide for selecting predetermined commutator tangs.

24 Claims, 8 Drawing Figures

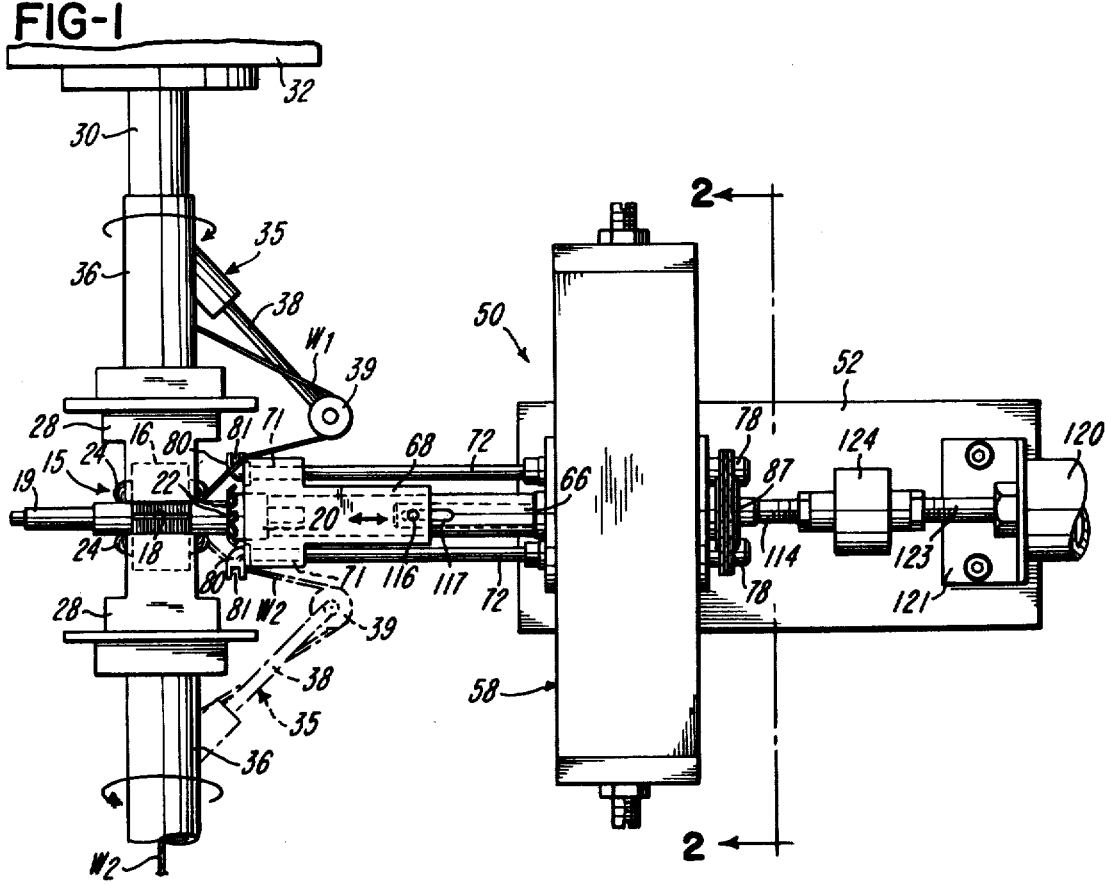
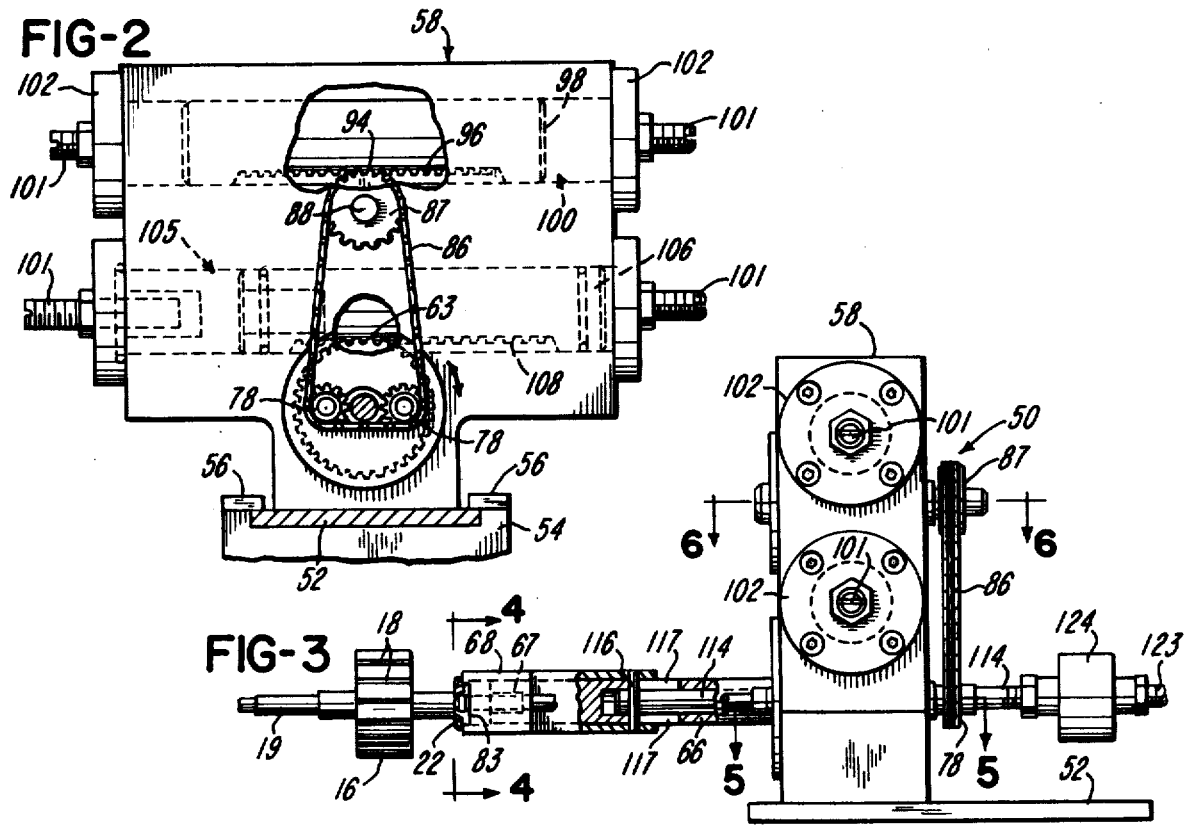
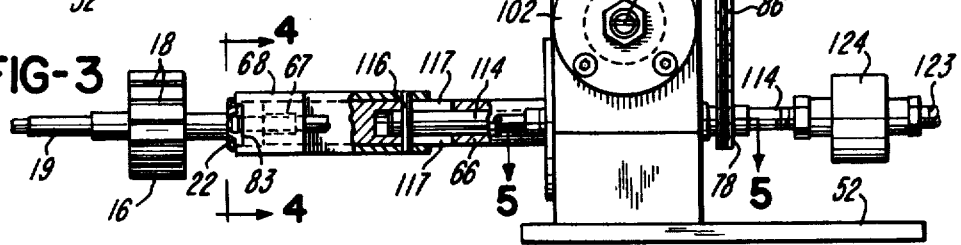

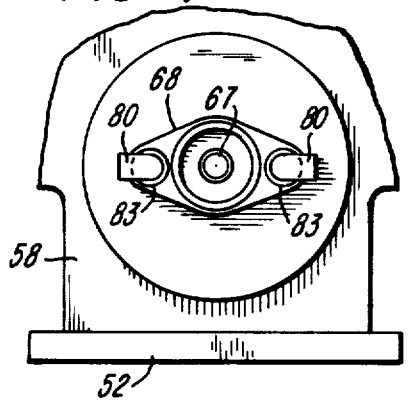
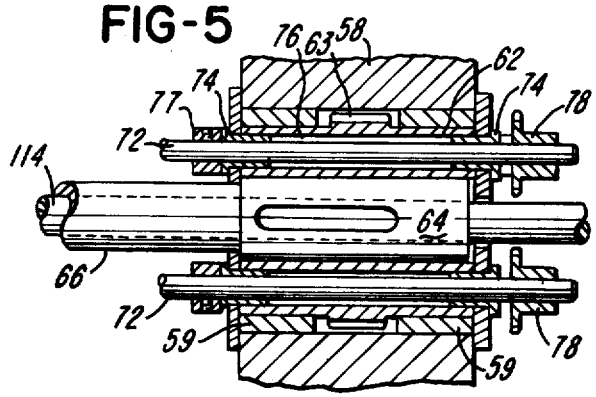
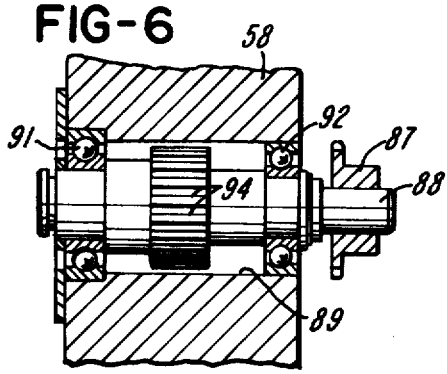
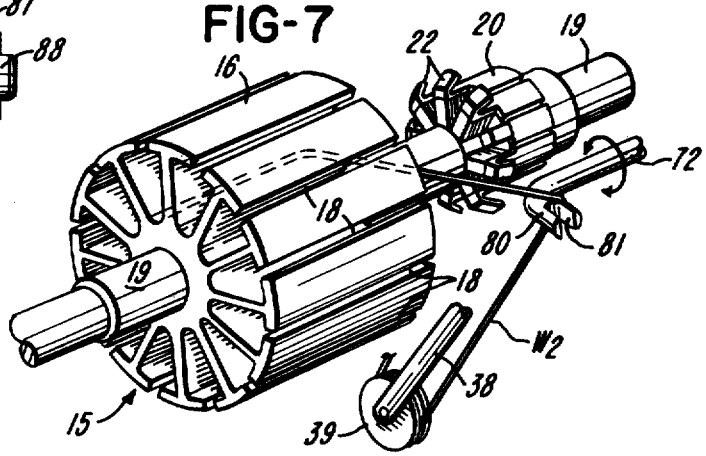
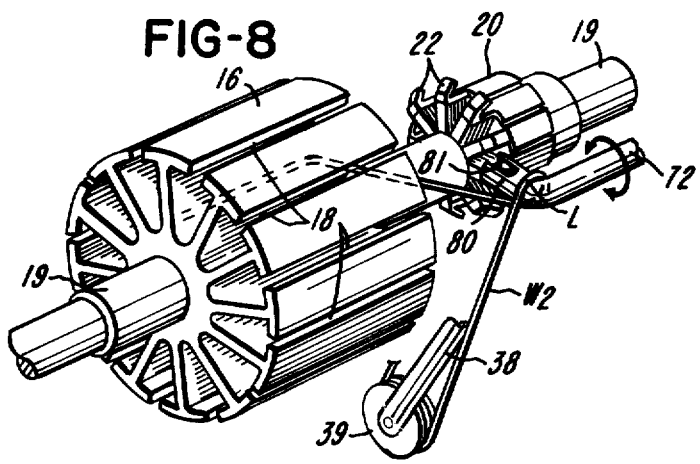

APPARATUS AND METHOD FOR WINDING ARMATURES

BACKGROUND OF THE INVENTION

In the winding of an armature of the type which includes an armature shaft supporting a slotted core and a commutator having peripherally spaced hook-like tangs, it is common to use an automatic armature winding machine of the general type disclosed in U.S. Pat. Nos. 2,267,379 and 3,013,737. This general type of winding machine is sometimes constructed to form an "alpha-type" connection between the wire leads extending from each coil and its corresponding commutator tangs. Such "alpha-type" lead connections are disclosed in British Pat. No. 942,026 and also in U.S. Pat. No. 3,857,172 which issued to the assignee of the present invention.

When winding some armatures which have many coils of fine wire, it is sometimes desirable to wrap each lead wire completely around the armature shaft when the lead wire is being connected to a corresponding tang, for example, as disclosed in U.S. Pat. No. Re. 27,893. This form of winding is sometimes helpful to avoid tearing or severing of the lead wires as successive coils are wound and the end-turns of the coils build up on top of the lead wires and apply pressure to the lead wires. On the other hand, when armatures with relatively heavy wire, such as armatures commonly used in the low voltage automotive field, it is common to use heavy tangs on the commutator to avoid bending and breaking of the tangs as a result of the tension in the lead wires created by the build-up of coil during the winding operation. This results in the commutator requiring more copper metal and in a correspondingly greater cost.

In the operation of an automatic double-flyer winding machine for winding an armature with "alpha-type" connections of the lead wires to the tangs, such as disclosed in above U.S. Pat. No. 3,857,172, a typical winding operation includes the following steps:

1. An unwound armature is positioned between the winding forms or chucks, and the chucks are closed.
2. The armature is rotated or indexed on its axis to orientate the core's slots precisely with respect to the winding forms or chucks.
3. Each flyer is rotated forwardly and then stopped at a predetermined "normal" stop position.
4. The cylindrical outer shield surrounding the commutator is retracted to expose a set of predetermined tangs.
5. Wire deflectors are moved into the winding paths of the wires extending from the flyers.
6. The flyers are then reversed or rotated in the opposite direction from winding to hook the corresponding exposed tangs with the wires extending from the flyers.
7. The wire deflectors are retracted out of the paths of the wires extending from the flyers.
8. The outer shield is extended to cover the exposed tangs hooked with the wires.
9. A set of wire coils is wound and the flyers stop at their normal stop positions.
10. The armature is indexed to present another set of core slots.
11. The outer shield is retracted to expose another set of commutator tangs.
12. The wire deflectors are shifted into the paths of the wires extending from the flyer.
13. The flyers are reversed or rotated in an opposite direction to hook the corresponding wires onto the exposed tangs.
14. The wire deflectors are retracted out of the wire path.
15. The outer shield is extended to cover the exposed tangs.
16. A second set of coils is wound, and the flyers stop. The above winding steps are repeated for winding each coil on the armature core, and the cycle time required for completely winding a typical armature is on the order of 20 to 40 seconds.

SUMMARY OF THE INVENTION

The present invention is directed to an improved method and apparatus for winding armatures with tang-type commutators and which significantly decreases the time required for forming an alpha-type connection of each lead wire to its corresponding commutator tang. The present invention significantly decreases the cycle time for automatically winding an armature with alpha-type tang connections and thereby provides for a more efficient winding operation. The apparatus of the invention also provides for a simplified structure which results in a more dependable winding operation and a requirement of less maintenance. The winding method and apparatus of the invention further provide for winding armatures with relatively heavy wire and for controlling the tension exerted on each tang during the winding operation so that the mass of the commutator and the tangs may be minimized.

In accordance with one embodiment of the invention, the above features and advantages are provided by an automatic armature winding machine which incorporates a mechanism having a pair of hook-like fingers each of which is supported for rotation on an axis spaced parallel to the axis of an armature supported at the winding station. Each of the fingers is rotatable on its axis through an angle of approximately 180°, and the fingers are also rotatable as a unit in order to revolve the fingers within a predetermined angle about the axis of the armature.

When the finger members are rotated to outwardly projecting positions, each finger member projects into the path of the wire extending from the corresponding rotating flyer so that a loop portion of the wire is hooked by the finger. Each finger member is then rotated on its axis so that the wire loop is twisted, and the twisted wire loop is transferred from the finger member to a predetermined commutator tang, thereby forming a lead wire having an alpha-type connection with the tang. Means are also provided to control the timing when the twisted wire loop is transferred from each finger member to its corresponding tang and thereby control the tension and the slack within the lead wire.

Other features and advantages of the invention will be apparent from the following description, the accompanying drawings and the appended claims.

BRIEF DESCRIPTION OF THE DRAWINGS

FIG. 1 is a fragmentary plan view of an armature winding machine or apparatus incorporating a lead forming and connecting mechanism constructed in accordance with the invention, and illustrating its relation with a partially wound armature;

FIG. 2 is a vertical section of the mechanism taken generally on the line 2—2 of FIG. 1;

FIG. 3 is a side elevational view of the mechanism shown in FIG. 1 and illustrating its relation with respect to an unwound armature;

FIG. 4 is a fragmentary end view of the mechanism taken generally on the line 4—4 of FIG. 3;

FIG. 5 is a fragmentary section taken generally on the line 5—5 of FIG. 3;

FIG. 6 is a fragmentary section taken generally on the line 6—6 of FIG. 3; and

FIGS. 7 and 8 are fragmentary perspective view illustrating schematically the principal of operation of the lead forming and connecting mechanism shown in FIGS. 1-6.

DESCRIPTION OF THE PREFERRED EMBODIMENT

Referring to FIG. 1, the automatic winding machine constructed in accordance with the invention is particularly suited for winding an armature 15 consisting of a laminated core 16 having peripherally spaced slots 18 and rigidly secured to an armature shaft 19. The shaft 19 also supports a commutator 20 having peripherally spaced commutator segments each having a hook-like tang 22 projecting outwardly from the inner end of the commutator. In a conventional manner, the slots 18 receive corresponding wire coils 24 which are formed by simultaneously winding a set of supply wires W1 and W2. Each of the coils 24 has wire leads which are connected to predetermined tangs 22 by means of alphatype loops. The commutator tangs 22 are subsequently hot-staked to the corresponding wire leads to form electrical connections between the wire leads and the corresponding segments or bars of the commutator 20.

The successive winding of the wire cells 24 is performed while the armature coil 16 is gripped or retained by a pair of opposing wire forming chucks 28 each having a semi-cylindrical center cavity conforming to the curvature of the coil 16. Each of the chucks 28 is supported by an antifriction bearing (not shown) mounted on the outer end portion of a corresponding tubular spindle 30 through which the corresponding wire is supplied. Each of the spindles 30 is supported for both rotary and axial movement by suitable bearings located within a corresponding housing portion 32 of the armature winding machine.

A flyer assembly 35 is rigidly secured to each of the spindles 30 for rotation therewith and includes a hub portion 36 which supports an outwardly projecting flyer arm 38. A wire guide roller 39 is mounted on the outer end portion of each flyer arm 38 for guiding the corresponding wire, and the opposing flyer assemblies 35 rotate in opposite directions during the winding operation.

In accordance with the present invention, the end wire leads extending from each of the wire coils 24 and which connect succesively wound coils, are attached to the corresponding commutator tangs 22 by a lead forming and connecting mechanism 50. This mechanism 50 includes a support plate 52 which is mounted on a base member 54 forming part of the winding mechanism housing. The support plate 52 is secured to the base member 54 by a set of opposing clamping strips 56.

An actuator housing 58 is mounted on the base support plate 52 and retains a set of axially spaced bearings 59 (FIG. 5) which support a generally cylindrical annular hub 62 having a peripherally extending integral gear teeth 63 located between the bearings 59. The hub 62 has a center bore which supports a slightly enlarged cylindrical portion 64 of a tubular shaft 66. The forward end portion of the shaft 66 has a center opening or bore 67 (FIG. 3) which is adapted to receive the projecting end portion of the armature shaft 19.

The forward projecting portion of the tubular shaft 66 also supports a T-shaped wire clamping member 68 (FIG. 1) which is adopted to slide axially on the shaft 66. The clamping member 68 includes a head portion which has diametrically opposed and axially extending bores 71 (FIG. 1) for rotatably supporting a corresponding pair of diametrically opposed finger rods 72. The rearward end portion of each rod 72 is rotatably supported by a pair of aligned bearings 74 (FIG. 5) which are retained within a corresponding axially extending eccentric bore 76 formed within the annular hub 62. Each of the rods 72 is prevented from axial movement by a collar 77 and a sprocket 78 which are secured to the rod 72 adjacent the bearings 74.

As shown in FIGS. 1 and 4, the forward end or head portion of the wire clamping member 68 has a bore for receiving the commutator 20, and the forward end portions of the rod 72 carry a corresponding pair of L-shaped finger elements or members 80 each having an outer cavity or recess 81. A cavity 83 (FIGS. 3 and 4) is formed within the forward flat end surface of the clamping member 68 adjacent each of the finger members 80 and is adapted to receive the lead wire which is hooked onto the finger member, as will be explained later.

Referring to FIGS. 2, 5 and 6, an endless flexible drive chain 86 extends around the sprockets 78 and also around a sprocket 87 (FIG. 6) which is mounted on the rearward end portion of a shaft 88 extending within a bore 89 formed within the actuator housing 58 above the bore which receives the annular hub 62. The shaft 88 is supported by a set of antifriction bearings 91 and 92 which are retained by the housing 58, and the shaft 88 includes center gear teeth 94. The gear teeth 94 mesh with a linear gear or rack 96 (FIG. 2) formed on the bottom portion of a piston 98 of a laterally extending fluid or air cylinder 100 formed within the upper portion of the housing 58.

When fluid or air is alternately supplied to opposite ends of the piston 98, the rods 72 oscillate to position the finger members 80 between outwardly projecting wire engaging or hooking positions (FIG. 1) and radially inwardly projecting wire releasing positions where the cavities 81 in the finger members 80 receive a corresponding pair of diametrically opposed commutator tangs 22. A set of adjustment screws 101 are mounted within end closure plates 102 of the cylinder 100 and provide for precisely adjusting the limits of travel of the piston 98 and the corresponding rotation of the finger members 80.

A second laterally extending fluid or air cylinder 105 (FIG. 2) is formed within the actuator housing 58 below the air cylinder 100 and includes a slidable piston 106 having a linear gear or rack 108 formed on its lower portion. The rack 108 engages the gear teeth 63 on the center portion of the hub 62. Thus when fluid or air is alternately supplied to opposite ends of the piston 106, the hub 62 rotates in opposite directions on the axis of the shaft 66 so that the wire clamping member 68 and the finger members 80 are shifted or rotated as a unit relative to the commutator 20. This rotation of the clamping member 68 enables the finger members 80 to be revolved through a predetermined angle and thereby selectively positioned with respect to predetermined sets of commutator tangs 22. Another set of screws 101 provide for adjusting the limits of movement of the piston 106 and the angle of rotation of the wire clamping member 68.

As shown in FIGS. 1 and 5, an actuator rod 114 extends through the center of the tubular shaft 66 and has a forward end portion which is connected by a cross pin 116 (FIGS. 1 and 3) to the rearward end portion of the wire clamping member 68. The pin 116 through an axially extending set of slots 117 (FIG. 3) formed within the tubular shaft 66 so that the rod 114 and the wire clamping member 68 may be shifted axially relative to the shaft 66. The pin 116 also provides for rotary movement of the wire clamping member 68 with the shaft 66 which is keyed to rotate with the hub 62 in response to actuation of the air cylinder 105.

The axial movement of the actuating rod 114 and the wire clamping member 68 is produced by a fluid or air cylinder 120 (FIG. 1) which is supported by an L-shaped bracket 121 mounted on the base plate 52. The cylinder 120 includes a piston rod 123 which is connected by a flexible coupling 124 to the rearward end portion of the actuating rod 114. Thus when the air cylinder 120 is actuated, the wire clamping member 68 is shifted between its forward wire clamping position (FIG. 1) and a retracted position (not shown) to provide for releasing of the lead wires on the finger members 80.

In operation of the lead forming and connecting mechanism 50, after each pair of coils 24 are simultaneously wound by the double flyer armature winding machine and during the winding of the last or final turns of the coils, the air cylinder 100 is actuated to rotate the finger members 80 from inwardly projecting opposing positions to outwardly projecting positions as shown in FIG. 1. As the flyers 38 rotate to their normal stop positions, wires W1 and W2 hook onto the corresponding finger members 80 as illustrated in FIGS. 1 and 7. The armature 15 is then indexed to present another set of coil receiving slots relative to the wire forming chucks 28, and the air cylinder 100 is actuated in the opposite direction to rotate each of the finger members 80 approximately 180°, as schematically illustrated in FIG. 8.

When each of the finger members 80 is rotated to its inwardly projecting position, the corresponding lead wire is twisted to form a twisted wire loop L (FIG. 8) on the finger member 80. As the twisted wire loops L are formed, the air cylinder 120 is actuated so that the piston rod 23 is extended with a predetermined pressure, causing the wire clamping member 68 to clamp the wire loops L against the corresponding finger members 80.

While the next set or pair of coils 24 are being wound be rotation of the flyer assemblies 35, the wire clamping member 68 is retracted permitting the twisted wire loops L to slide from the corresponding finger members 80 onto the corresponding commutator tangs 22 which are located within the recesses 81 of the finger members. Thus by controlling the actuation of the wire clamping member 68, the timing of when the twisted wire loops L are transferred from the finger members 80 to the commutator tangs 22 is controlled for producing a predetermined slack within the wire leads. During the winding of the final turns of the next pair of coils 24, the finger members 80 are each rotated outwardly for again hooking the wires extending from the rotating flyer assemblies, as illustrated in FIG. 7.

The above sequence of operation is repeated after the winding of each pair of coils 24 until the armature is completely wound. By actuation of the fluid cylinder 105, the finger members 80 and the wire clamping member 68 are rotated as a unit. This permits the finger members 80 and the corresponding wire loops L to be shifted to the predetermined commutator tangs 22 which are to receive the twisted lead wire loops L.

From the drawings and the above description, it is apparent that an armature winding machine incorporating a lead forming and connecting mechanism constructed in accordance with the invention, provides several desirable features and advantages. As a primary advantage, the time required for winding an armature having alpha-type tang connections, is substantially reduced. That is, by eliminating more than one-half of the above outlined steps normally required for winding an armature on a conventional armature winding machine, including the elimination of the need for reversing the direction of rotation of the flyers, an armature can be wound on apparatus of the present invention in less than one-half the normal time required for winding an armature on a conventional winding machine. For example, in one experimental operation of a winding machine constructed in accordance with the invention, the total cycle time for winding an armature was reduced from the normal 40 seconds to 16 seconds. This substantial time reduction provides for substantially increasing the production rate of an existing armature winding machine by modifying the machine in accordance with the present invention.

As another important feature, by initially forming the wire loops L on the finger members 80, the force produced by the wire tension and the buildup of wire turns on each coil during the winding operation, is transferred from the commutator tangs 22 to the finger members 80. As a result, the tangs can be constructed of lighter weight material, which is especially desirable in "automotive"-type armatures which are usually wound with relatively heavy wire and have previously required heavy commutator tangs to prevent bending of the tangs due to the force exerted on the lead wires as the overlapping wire turns build up during the winding of each coil.

It is also apparent that the shape of each finger member 80 determines how each twisted wire loop L slides from the finger member onto its corresponding commutator tang. Thus the shape of the finger members 80 controls the amount of slack which is developed within the wire leads extending from the wound coils to the commutator tangs. Accordingly, it is within the scope of the invention to provide for interchangeable finger membranes 80 each having a slightly different shape according to the type of armatures being wound, including the gauge of the wire used, the desired amount of slack in the lead wires, etc.

The support of the wire clamping member 68 and the finger members 80 for rotation as a unit also provides for picking up different sets of commutator tangs 22 according to the desired winding pattern for the armature. The commutator tangs selected by rotation of the unit will usually be within the span of the coil from which the lead wire extends. While the use of the wire clamping member 68 is desirable in connection with the winding of some armatures, it has been determined that the wire clamping member 68 is not essential for the winding of other armatures. When the retractable wire clamping member 68 is not used, the transfer of the twisted wire loops L from the finger members 80 to the corresponding commutator tangs 22 is controlled by the shape of the finger members 80 and by timing when the finger members are rotated to their inwardly projecting positions receiving the corresponding tangs.

While the method and form of armature winding apparatus herein described constitute a preferred embodiment of the invention, it is to be understood that the invention is not limited to the precise method and form of apparatus described, and that changes may be made therein without departing from the scope and spirit of the invention as defined in the appended claims.

The invention having thus been described, the following is claimed:

1. A method for winding an armature including a shaft supporting a core and a commutator having peripherally spaced tangs, comprising the steps of winding a wire on said core to form a wire coil, extending the wire from the wire coil about a member supported for movement, moving said member for twisting the wire to form a twisted wire loop on said member, transferring the twisted wire loop from said member to one of said tangs, and successively repeating the above steps to form a plurality of wire coils continuously interconnected by lead wires each having a twisted wire loop connection with a corresponding tang.

2. A method for winding an armature including a shaft supporting a core and a commutator having peripherally spaced tangs, comprising the steps of winding a wire on said core to form a first wire coil, hooking the wire extending from the first wire coil onto a member supported for rotation on a predetermined axis, winding a second wire coil on said core with the wire extending from said member, rotating said member for twisting the wire to form a twisted wire loop, and transferring the twisted wire loop from said member to one of said tangs.

3. A method for winding an armature including a shaft supporting a core and a commutator having peripherally spaced tangs, comprising the steps of rotating a flyer for winding a wire on said core to form a wire coil, hooking the wire extending from the wire coil about a hook-like finger member supported for rotation on an axis generally parallel to the axis of the armature shaft, rotating said finger member on its axis for twisting the wire to form a twisted wire loop on said finger member, and transferring the twisted wire loop from said finger member to one of said tangs.

4. A method for winding an armature including a shaft supporting a core and a commutator having peripherally spaced tangs, comprising the steps of winding a wire on said core to form a wire coil, moving a wire engaging member into the path of the wire while winding the last turn of the wire coil to effect hooking of the wire engaging member with the wire and to form a wire lead, rotating said wire engaging member for twisting the wire lead to form a twisted wire loop on said wire engaging member, transferring the twisted wire loop from said wire engaging member to one of said tangs, indexing the armature on the axis of the armature shaft, and successively repeating the aforementioned steps for winding a series of wire coils on said core and for connecting the wire leads extending between successive coils to corresponding said tangs.

5. A method for winding an armature including a shaft supporting a core and a commutator having peripherally spaced tangs, comprising the steps of simultaneously winding separate wires on said core to form a set of wire coils, simultaneously hooking corresponding wires extending from said coils onto a corresponding set of wire engaging members supported for rotation on corresponding axes, simultaneously rotating said wire engaging members for twisting the corresponding wires to form corresponding twisted wire loops on said members, and simultaneously transferring the twisted wire loops from said wire engaging members to a corresponding set of said tangs on said commutator.

6. A method for winding an armature including a shaft supporting a core and a commutator having peripherally spaced tangs, comprising the steps of simultaneously rotating a set of flyers for winding corresponding separate wires on said core to form a set of wire coils, simultaneously moving a set of corresponding hook-like finger members into the paths of the wires while winding the last turns of said coils to effect hooking of the wires extending from said coils onto corresponding said finger members, simultaneously rotating said finger members for twisting the wires to form corresponding twisted wire loops on said finger members, simultaneously transferring said twisted wire loops from said finger members to a corresponding set of said tangs, indexing the armature on the axis of said armature shaft, and successively repeating the aforementioned steps for winding a series of wire coils on said core and for connecting the lead wires extending between corresponding successive coils to corresponding predetermined tangs on said commutator.

7. In apparatus for winding an armature having a shaft supporting a core and a commutator having peripherally spaced segments, said apparatus including means for supporting an armature at a winding station, at least one flyer supported for rotation relative to said supporting means for successively winding a series of coils on said core, an improved mechanism for rapidly connecting the wire leads extending from and between successively wound wire coils to said segments, comprising a wire engaging member positioned for receiving a wire lead extending from said flyer to a wire coil, power operated means for moving said wire engaging member to effect twisting of the wire lead to form a twisted wire loop on said engaging member, and means for transferring the twisted wire loop from said wire engaging member to one of said segments of said commutator.

8. Apparatus as defined in claim 7 including means supporting said wire engaging member for rotation on an axis extending generally parallel to the axis of said armature shaft, and means for at least partly revolving the said wire engaging member partly about the axis of said armature shaft.

9. In apparatus for winding an armature having a shaft supporting a core and a commutator having peripherally spaced segments, said apparatus including means for supporting an armature at a winding station, at least one flyer supported for rotation relative to said supporting means for successively winding a series of coils on said core, an improved mechanism for rapidly connecting the wire leads extending from and between successively wound wire coils to said segments, comprising a hook-like finger positioned for receiving a wire lead extending from said flyer to a wire coil and supported for rotation on an axis extending in substantially parallel spaced relation with the axis of the armature shaft, power operated means for rotating said finger on its axis to effect twisting of the wire lead to form a twisted wire loop on said finger, and means for transferring the twisted wire loop from said finger to one of said segments of said commutator.

10. Apparatus as defined in claim 9 wherein said finger has an outer end portion defining a recess for receiving a portion of said segment.

11. In apparatus for winding an armature having a shaft supporting a core and a commutator having peripherally spaced segments, said apparatus including means for supporting an armature at a winding station, at least one flyer supported for rotation relative to said supporting means for successively winding a series of coils on said core, an improved mechanism for rapidly connecting the wire leads extending from and between successively wound wire coils to said segments, comprising a wire engaging member positioned for receiving a wire lead extending from said flyer to a wire coil, a wire retaining member disposed adjacent said wire engaging member, power operated means for moving said wire engaging member to effect twisting of the wire lead to form a twisted wire loop on said engaging member, means for transferring the twisted wire loop from said wire engaging member to one of said segments of said commutator, and means for producing relative movement between said members for releasably retaining a wire loop on said wire engaging member to control the transfer of the wire loop to a commutator segment.

12. In apparatus for winding an armature having a shaft supporting a core and a commutator having a peripherally spaced segments, said apparatus including means for supporting an armature at a winding station, a set of flyers supported for rotation relative to said supporting means for successively winding a series of coils on said core, an improved mechanism for rapidly connecting the wire leads extending from and between successively wound wire coils to said segments, comprising a set of wire engaging members positioned for receiving a commutator therebetween and for receiving corresponding wire leads extending from said flyers to corresponding wire coils, means supporting each of said wire engaging members for rotation on a corresponding axis different from the axis of said armature shaft, power operated means for moving said wire engaging members to effect twisting of the corresponding wire leads to form twisted wire loops on said engaging members, and means for transferring the twisted wire loops from said wire engaging members to corresponding said segments of said commutator.

13. Apparatus as defined in claim 12 wherein each of said wire engaging members comprise a hook-like finger, and said fingers are supported for rotation on corresponding parallel spaced axes defining a plane extending substantially through the axis of said armature shaft.

14. Apparatus as defined in claim 12 including a wire clamping member disposed adjacent said wire engaging members, and means for moving said wire clamping member relative to said wire engaging members for clamping the corresponding wire loops on said wire engaging members to control the transfer of the wire loops to the corresponding said segments.

15. Apparatus as defined in claim 12 including means for revolving said wire engaging members as a unit at least partly about the axis of said armature shaft for moving said wire engaging members relative to selectable corresponding said segments.

16. In apparatus for winding an armature having a shaft supporting a core and a commutator having peripherally spaced tangs, said apparatus including means for supporting an armature at a winding station, a set of flyers each supported for rotation relative to said supporting means for successively winding a series of coils on said core, an improved mechanism for rapidly connecting the wire leads extending from and between successively wound wire coils to said tangs, comprising a set of wire engaging members positioned for receiving corresponding wire leads extending from said flyers to corresponding wire coils, means for rotating each of said wire engaging members on a corresponding axis to effect twisting of the corresponding wire lead to form a twisted wire loop on said wire engaging member, and means for transferring the twisted wire loop on each of said wire engaging members to one of said tangs.

17. Apparatus as defined in claim 16 wherein each of said wire engaging members comprises a generally hook-like finger supported for rotation on an axis extending in substantially parallel spaced relation with the axis of said armature shaft.

18. Apparatus as defined in claim 17 wherein each of said fingers has an outer end portion defining a recess for receiving a tang.

19. Apparatus as defined in claim 16 including means for at least partly revolving said wire engaging members as a unit about the axis of said armature shaft.

20. Apparatus for winding an armature having a shaft supporting a core and a commutator having peripherally spaced tangs, comprising means for supporting an armature at a winding station, means for successively winding a series of coils on said core, means for receiving a wire lead extending from said winding means to a wire coil, means for moving said wire receiving means to effect twisting of the wire lead until the wire lead crosses itself to form a twisted wire loop on said wire receiving means, and means for transferring the twisted wire loop from said wire receiving means to one of said tangs of said commutator.

21. Apparatus as defined in claim 20 wherein said wire receiving means comprise a generally hook-like finger supported for rotation on an axis extending in spaced relation with the axis of said armature shaft.

22. Apparatus as defined in claim 21 wherein said finger has an outer end portion defining a recess for receiving a tang.

23. Apparatus as defined in claim 20 including power operated means for releasably retaining the twisted wire loop on said wire receiving means until a transfer is desired.

24. A method for winding an armature including a shaft supporting a core and a commutator having peripherally spaced tangs, comprising the steps of inserting the armature into a winding machine having power operated winding means, winding a wire on the core with said winding means to form a wire coil, extending the wire leading from said winding means to the core to form a wire loop, twisting a portion of the wire loop until the wire crosses itself to form a twisted wire loop portion, thereafter depositing the twisted wire loop portion onto one of said tangs, and successively repeating the above steps to form a plurality of wire coils continuously interconnected by lead wires each having a twisted wire loop connection with a corresponding tang.

* * * * *